United States Patent
Bueno Peña et al.

(10) Patent No.: US 11,522,479 B2
(45) Date of Patent: Dec. 6, 2022

(54) METHOD AND SYSTEM OF SUBSYNCHRONOUS OSCILLATIONS AND INTERACTIONS DAMPING

(71) Applicant: Siemens Gamesa Renewable Energy Innovation & Technology S.L., Sarriguren (ES)

(72) Inventors: Emilio José Bueno Peña, Alcalá de Henares (ES); Aurelio García Cerrada, Madrid (ES); Almudena Muñoz Babiano, Madrid (ES); Luis Rouco Rodriguez, Madrid (ES); Arturo Santillan León, Madrid (ES); Elena Sáiz Marín, Madrid (ES); Juan Luis Zamora Macho, Madrid (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 17/312,453

(22) PCT Filed: Dec. 19, 2018

(86) PCT No.: PCT/EP2018/079754
§ 371 (c)(1),
(2) Date: Jun. 10, 2021

(87) PCT Pub. No.: WO2020/125920
PCT Pub. Date: Jun. 25, 2020

(65) Prior Publication Data
US 2022/0052632 A1 Feb. 17, 2022

(51) Int. Cl.
*H02P 9/10* (2006.01)
*H02P 9/00* (2006.01)
(Continued)

(52) U.S. Cl.
CPC ............. *H02P 9/105* (2013.01); *H02P 9/007* (2013.01); *H02P 9/04* (2013.01); *F03D 7/0272* (2013.01);
(Continued)

(58) Field of Classification Search
CPC .. H02P 9/105; H02P 9/007; H02P 9/04; H02P 2201/15; F03D 7/0272; F03D 7/0296
See application file for complete search history.

(56) References Cited

U.S. PATENT DOCUMENTS

2012/0139243 A1   6/2012 Koerber

FOREIGN PATENT DOCUMENTS

| EP | 0239806 A1 | 10/1987 | |
| EP | 2224129 A2 * | 9/2010 | ........... F03D 7/0284 |

(Continued)

OTHER PUBLICATIONS

Thirumalaivasan R et al: "Kalman Filter based Detection and Mitigation of Subsynchronous Resonance with SSSC"; IEEE Transactions on Power Systems.,May 24, 2016 (May 24, 2016), pp. 1400-1409; XP055611511, US ISSN: 0885-8950, DOI: 0.1109/TPWRS.2016.2572301; 2016.

(Continued)

*Primary Examiner* — Viet P Nguyen
(74) *Attorney, Agent, or Firm* — Schmeiser, Olsen & Watts LLP

(57) ABSTRACT

A method and system of subsynchronous oscillations and interactions damping integrated in in a rotor converter based on an adaptive state feedback controller with two spinning vectors, and a Kalman filter whose parameters are optimized by minimizing maximum sensitivity under a constraint of positive damping for a plurality of sensible scenarios is provided. The damping signal generated by the damping (Continued)

module is applied either to a power proportional integer controller or to a current proportional integer controller.

15 Claims, 3 Drawing Sheets

(51) Int. Cl.
*H02P 9/04* (2006.01)
*F03D 7/02* (2006.01)

(52) U.S. Cl.
CPC ........ *F03D 7/0296* (2013.01); *H02P 2201/15* (2013.01)

(56) References Cited

FOREIGN PATENT DOCUMENTS

| EP | 2544358 A1 | 1/2013 |
|---|---|---|
| EP | 2574776 A2 | 4/2013 |
| WO | 2011112571 A2 | 9/2011 |

OTHER PUBLICATIONS

PCT International Search Report & Written Opinion dated Aug. 19, 2019 corresponding to PCT International Application No. PCT/EP2018/079754.

* cited by examiner

METHOD AND SYSTEM OF SUBSYNCHRONOUS OSCILLATIONS AND INTERACTIONS DAMPING

CROSS-REFERENCE TO RELATED APPLICATIONS

This application is a national stage entry of PCT Application No. PCT/EP2018/079754 having a filing date of Dec. 19, 2018, the entire contents of which are hereby incorporated by reference.

FIELD OF TECHNOLOGY

The following relates to the energy sector and, especially, in the industrial area engaged in mitigating sub-synchronous resonances and interactions in wind turbines.

BACKGROUND

Energy generation systems based on wind turbines are subject to several types of sub-synchronous interactions (SSI). Depending on the system elements which interact, SSI can be classified into sub-synchronous resonances (SSR), sub-synchronous control interactions (SSCI), and sub-synchronous torsional interactions (SSTI). SSR deal with the interactions between the ensemble generator-turbine system and the series compensated grid, SSCI deal with the interaction between the grid and the controllers, and SSTI deal with the interaction between the mechanical system and the controller.

Furthermore, sub-synchronous resonances (SSR) can be caused by induction generator effects (IGE), torque amplification (TA) and torque interaction (TI):

Induction generator effect: this phenomenon is purely electrical and appears in systems with significant series compensation. For subsynchronous frequencies, the rotor resistance is negative. If its value is higher than the grid resistance, subsynchronous currents are induced. This effect rarely happens in synchronous machine and is hence rarely treated in the literature.

Torsional interactions: this phenomenon is purely mechanical and takes place when the induced subsynchronous torque in the generator is electrically close to natural frequencies of the drive-train. As a result, there is an energy exchange between the electric power system and the generator shaft. Typically, this phenomenon takes place in thermal plants when the turbine inertia is of the same order than the generator one. This is a critical effect, as it can result in the generator shaft damage.

Torque amplification: this phenomenon results from system disturbances. Each disturbance results in a sudden current variation that will tend to oscillate. If the frequency of these oscillations coincides with one of the generator shaft natural frequencies, large torques will be experienced.

It must be noted that torsional modes can be unstable not only because of torsional interaction (TI), but also from interaction between the mechanical system and the controller (SSTI). Hence, in this case the grid does not play any role. Contrarily, electrical modes can be affected due to interaction between the grid and the controllers (SSCI).

Although subsynchronous events were thoroughly studied in synchronous generators, it was originally considered that wind generators were immune due to decoupling between grid and drive train. However, it was later proved that different types of wind turbines can also be subject to subsynchronous events:

Induction machines may be subject to SSR and SSTI, whereas SSCI are not possible.

Induction generation effect has an important role in this case. Rotor resistance is negative for all sub-synchronous frequencies, indicating a high occurrence probability.

Nonetheless, this phenomenon only happens when the resistance of the whole system (i.e. machine plus grid) is negative or equal to zero. In the event of induction machine the negative resistance is at least ten times higher (in absolute value) than in synchronous machines increasing occurrence probability. Contrary, in the event of TI this probability is very low due to drive train natural frequencies (2-9 Hz) are far away from grid sub-synchronous frequency.

Doubly-fed Induction Generators (DFIG) may be subject to SSR and SSCI, whereas no evidence of SSTI is found. Induction generator effect has been identified as the main cause of subsynchronous effects, contrarily to synchronous machines where torsional interactions were the main cause.

Full converters cannot be subject to SSTI, whereas no evidence of SSR and SSCI have been found. The machine is directly connected to the grid trough converters, hence totally decoupling drive train and grid. Torsional interaction is very low, and only SSCI could induce a sub synchronous event in case of bad adjustment, although there are no practical evidences of this occurrence.

Several approaches have been developed in order to mitigate sub-synchronous interactions, which can be classified into filtering and damping, controllers' equipment and relays, electrical power system actions and structural generator modification. Within filtering and damping strategies, both active and passive methods are known in the state-of the art.

Passive filtering and damping methods:

Block static filters, inserted on the high-voltage side of the step-up transformers. They block sub-synchronous frequencies but requires hardware incorporation of inductances and capacitances.

Dynamic filters, connected in series with the generator. They damp induced voltages due to rotor oscillations but require hardware incorporation at high-frequency voltage source. Rotor current loop bandwidth of PI setting modification in the rotor converter. These settings have a significant impact on rotor resistance (negative at sub synchronous frequencies) but could interact with slower controllers. It is, nevertheless, the most cost-effective solution.

Active filtering and damping methods:

Dynamic stabilizer in the generator. Absorbed current is controlled and positive damping is obtained, but hardware incorporation of controlled reactances through thyristors is required.

Synchronous machines excitation controllers in generators or supplementary controllers in converters. It presents a low cost and large stability margins, but if the supplementary controllers is located in grid converter, it may not be effective for high compensation factors.

In particular, several solutions focused on rotor converters have been proposed. For example, WO 2011/112571 A2 discloses a software solution implemented in the converter which damps oscillations by regulating the voltage supplied to the grid. The turbine can actively damp sub synchronous resonant (SSR) voltages, currents and/or power oscillations based upon local or remote voltage, current or power measurements, such that SSR-damping functionality of the turbine is active only when SSR oscillations is detected locally or remotely. The turbine saves cost by avoiding usage of separate flexible alternating current (AC) transmission system controllers for damping the SSR oscillations.

EP 2544358 A1 discloses another software solution implemented in the converter which builds a new flux reference and a damping signal. The damping signal and the rotor flux reference are added to obtain a modified rotor flux reference, which is in turn fed to a controller on the rotor side for SSR damping.

Finally, two-stage controllers have also been proposed for avoiding SSCI. The aim of the first stage is sub-synchronous resonance frequency estimation, whereas the second stage directly damps that component.

These solutions assume that the network presents a positive damping for supersynchronous components. However, it has been observed that in the event of weak grids the distance between subsynchronous and supersynchronous modes is increased and supersynchronous mode can also be unstable.

In conclusion, there is still the need in the state of the art of an effective solution, within the filtering and damping methods, which prevents both subsynchronous and supersynchronous interactions and oscillations in an effective and adaptive manner.

SUMMARY

An aspect of the present invention solves the aforementioned problems by disclosing a subsynchronous oscillations and interactions damping technique, based in a Kalman filter and a state feedback controller with two spinning vectors (preventing resonances from subsynchronous and supersynchronous modes), which are integrated in the rotor converter.

In a first aspect of the present invention, a SSI damping system is disclosed which comprises:
  Measuring means which measure an input, which is chosen between wind turbine active power (P) and common coupling voltage (Vpcc).
  A damping module integrated in a rotor converter which generates a damping signal from the input power measurement through a Kalman filter and a state feedback controller with two spinning vectors, commonly one for subsynchronous oscillations and one for supersynchronous modes.
  At least one proportional integer (PI) controller, which incorporates the damping signals through one of its inputs and generates an output signal.
  Control means which apply the output signal to the machine rotor.

In a first exemplary option, the output of the damping module is applied, after subtraction at a subtraction module, to the input of a power PI controller. In this case, the damping signal is subtracted either from a set-point value of the active power ($P_{ref}$) or a set-point value of the reactive power ($Q_{ref}$).

In a second exemplary option, the output of the damping module is applied, after subtraction at a subtraction module, to the input of a current PI controller. In this case, the damping signal is subtracted from the set-point d-axis rotor current component ($id_{ref}$). Said set-point d-axis rotor current component ($id_{ref}$) may be computed at a power PI controller either from the active power (P) and set-point active power ($P_{ref}$); or from the reactive power (Q) and set-point reactive power ($Q_{ref}$). Before subtracting from the set-point d-axis rotor current component ($id_{ref}$) the damping signal is multiplied at multiplier by the relation between the induction generator (IG) magnetizing inductance (Lm) and the IG stator inductance (Ls). The stator inductance (Ls) is computed as the sum of the magnetizing inductance (Lm) and the stator leakage inductance.

In another aspect of the present invention, a subsynchronous oscillations and interactions damping method is disclosed, comprising the following steps:
  Measuring an input signal, selected between wind turbine active power (P) and common coupling voltage (Vpcc).
  Generating a damping signal from the input power measurement by applying a Kalman filter and a state-feedback controller with two spinning vectors. The Kalman filter is applied as discrete-time state-space model with sampling time (Ts).
  The variables of the two spinning vectors comprise a first frequency, a second frequency, a first gain, a second gain, a third gain and a fourth gain. More, the variables of the two spinning vectors are optimized by minimizing maximum sensitivity under a constraint of positive damping for a plurality of wind turbine generation plant scenarios. More, the plurality of scenarios consider variations in wind speed, grid reactance, compensation factors and/or reactive power.
  Incorporating the damping signal to the input of a PI controller, selected between a power PI controller and a current PI controller.
  Applying an output of the PI controller to a machine rotor.

Finally, in a third aspect of the present invention, a computer program is provided which implements the method of the present invention, therefore controlling the system of the present invention and processing the involved data. The computer program comprises computer program code means adapted to perform any embodiment of the method of the present invention when run on a computer, a digital signal processor, a field-programmable gate array, an application-specific integrated circuit, a micro-processor, a micro-controller, or any other form of programmable hardware. Notice that any exemplary embodiment or option of the system of the present invention may be applied to the method and computer program of the present invention and vice versa.

With the disclosed system, method and computer program, an efficient, adaptive and cost-effective solution is provided, capable of damping both subsynchronous and supersynchronous oscillations.

BRIEF DESCRIPTION

Some of the embodiments will be described in detail, with reference to the following figures, wherein like designations denote like members, wherein.

DETAILED DESCRIPTION

The matters defined in this detailed description are provided to assist in a comprehensive understanding of the present invention. Accordingly, those of ordinary skill in the art will recognize that variation changes and modifications of the embodiments described herein can be made without departing from the scope and spirit of the present invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
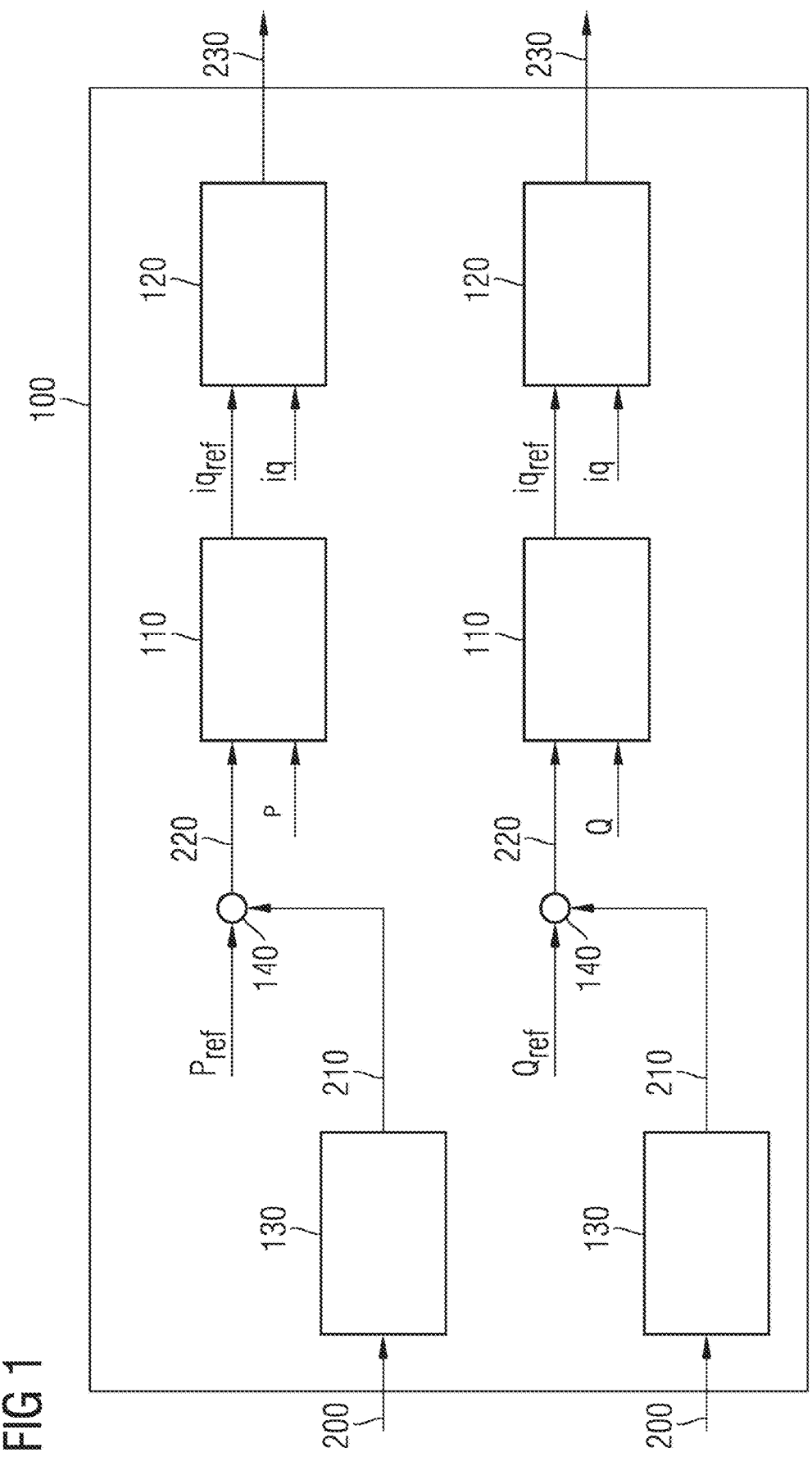
FIG. 1 depicts a first embodiment of the SSI damping system of the present invention wherein the damping signal is applied to the current PI controller.

FIG. 1 shows a first exemplary embodiment of the system of the present invention, where a damping module 130 implements the steps of a first exemplary embodiment of the method and computer program of the present invention. The damping module 130 is a supplementary controller integrated in a rotor converter 100 which comprises at least a power proportional integer (PI) controller 110 and a current PI controller 120. Notice that in case the rotor converter 100 does not provide enough capabilities to implement the damping module 130, said damping module 130 may be implemented in any additional device in such as an external static synchronous compensator (STATCOM).

The input variables of the damping module 130 are power measurements 200 selected from wind turbine active power (P) or the common coupling voltage (Vpcc). Only one of these two measurements 200, wind turbine active power or common coupling voltage, is required in the damping module 130. The optimal measurement 200 may be selected by a previous mathematical analysis once the power system configuration is defined. The output of the damping module is a damping signal 210 that is subtracted from the desired or set-point value of the reactive power $Q_{ref}$ at subtraction module 140. The resulting damped signal 220 is introduced in the power PI controller 110 along with the reactive power supplied through the generator stator Q. The output is a set-point q-axis rotor current component $iq_{ref}$ in a reference frame moving in synchronism with the stator voltage space vector. The reference frame d-axis is aligned with the stator voltage space vector whereas the q-axis is in quadrature with the stator voltage space vector. In the event that stator flux is employed as a reference, the output is a set-point d-axis rotor current component.

The set-points for d-axis and q-axis rotor current components ($id_{ref}$ and $iq_{ref}$) are introduced in the current PI controller 120 along with the measured d-axis and q-axis rotor current components (id and iq), generating output signal 230. The output signal 230 comprises the d-axis and q-axis components of the voltage space vector applied by the rotor converter to the machine rotor. These two signals are used in the pulse-width modulation (PWM) generator of the rotor converter.

Notice that the present invention can be implemented with a single damping module 130 which can be applied either to the set-point active power $P_{ref}$ or to the set-point reactive power $Q_{ref}$ supplied through the generator stator. In order to determine which of the two options provides a more optimal SSI damping, a previous mathematical analysis may be carried out.

Figure 2:
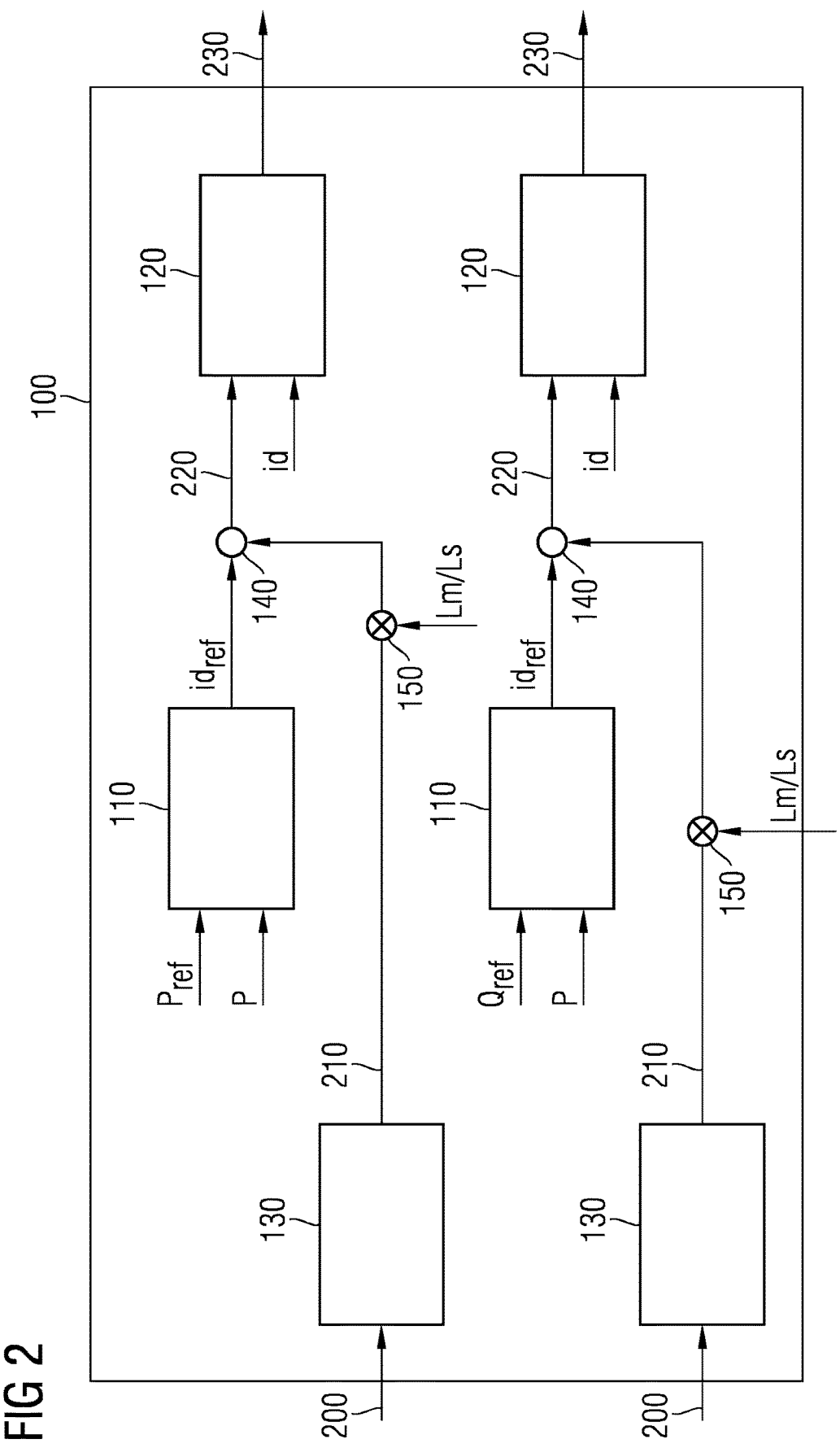
FIG. 2 depicts a second embodiment of the SSI damping system of the present invention wherein the damping signal is applied to the power PI controller.

FIG. 2 shows a second exemplary embodiment of the system of the present invention, where a damping module 130 implements the steps of a second exemplary embodiment of the method and computer program of the present invention. In this case, the damping module is applied to the input of the current PI controller 120, as a subtraction of the set-point d-axis rotor current component $id_{ref}$. That is, inputs of the first power PI controller 110 are the active power P computed from measured rotor speed and estimated motor torque and set-point active power $P_{ref}$; inputs of the second power PI controller 110 are reactive power Q and set-point reactive power $Q_{ref}$; and inputs of the current PI controllers 120 are damped signal 220 and the set-point d-axis rotor current component $id_{ref}$. Notice that, before subtracting from the set-point d-axis rotor current component $id_{ref}$ to generate the damped signal 220, the damping signal 210 is multiplied at multiplier 150—or at the damping module itself—by the relation between the induction generator (IG) magnetizing inductance (Lm) and the IG stator inductance (Ls). The stator inductance (Ls) is computed as the sum of the magnetizing inductance (Lm) and the stator leakage inductance.

As in the previous case, notice that the present invention can be implemented with a single damping module 130 which can be applied either to the set-point active power $P_{ref}$ or to the set-point reactive power $Q_{ref}$ supplied through the generator stator. In order to determine which of the two options provides a more optimal SSI damping, a previous mathematical analysis may be carried out.

Figure 3:
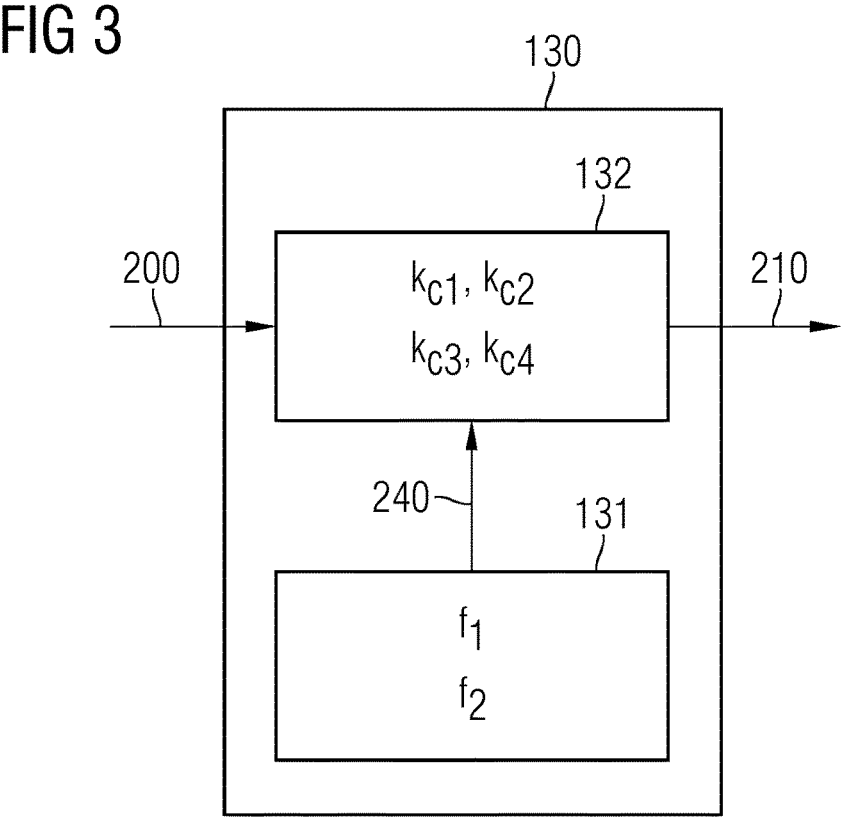
FIG. 3 depicts in further detail the components of the damping module, according to an exemplary embodiment of the present invention.

FIG. 3 shows in greater detail the components of an exemplary embodiment of the damping module 130, namely a state feedback controller 132 and a Kalman filter 131. The Kalman filter 131 estimates the state variables of a state-space signal model, consisting of two spinning space vectors rotating at constant frequencies $f_1$ and $f_2$ and a direct current (DC) value. Typically, one spinning vector rotates clockwise and the other one rotates anticlockwise and, therefore, frequencies $f_1$ and $f_2$ have opposite signs.

The state variables of this model are the real and imaginary parts of each space vector and the DC value. If y(t) represents the measured signal, it can be estimated, according to the proposed model, as:

$$y(t) = A_o + A_1 \text{real}(e^{j2\pi f_1 t}) + A_2 \text{real}(e^{j2\pi f_2 t}) =$$
$$= A_o + A_1 \cos(2\pi f_1 t) + A_2 \cos(2\pi f_2 t)$$

where $A_o$ is the dc component and $A_1$ and $A_2$ are the magnitudes of the spinning vectors used to reprent the signal y(t). Defining the state variables as:

$x_1(t) = A_1 \cos(2\pi f_1 t), x_2(t) = A_1 \sin(2\pi f_1 t),$ $x_3(t) = A_2 \cos(2\pi f_2 t), x_4(t) = A_2 \sin(2\pi f_2 t),$ $x_5(t) = A_o$ and, the state-space model is:

$$\frac{d}{dt}\begin{bmatrix} x_1(t) \\ x_2(t) \\ x_3(t) \\ x_4(t) \\ x_5(t) \end{bmatrix} = \begin{bmatrix} 0 & -2\pi f_1 & 0 & 0 & 0 \\ 2\pi f_1 & 0 & 0 & 0 & 0 \\ 0 & 0 & 0 & -2\pi f_2 & 0 \\ 0 & 0 & 2\pi f_2 & 0 & 0 \\ 0 & 0 & 0 & 0 & 1 \end{bmatrix} \begin{bmatrix} x_1(t) \\ x_2(t) \\ x_3(t) \\ x_4(t) \\ x_5(t) \end{bmatrix} + \begin{bmatrix} w_1(t) \\ w_2(t) \\ w_3(t) \\ w_4(t) \\ w_5(t) \end{bmatrix}$$

where X(t) is the state vector, A is the state matrix and W(t) is the process noise vector.

The estimated output ŷ(t) is represented by the sum of the real parts of the spinning vectors ($x_1$ and $x_3$) and the dc component ($x_5$):

$$\hat{y}(t) = \overbrace{\begin{bmatrix} 1 & 0 & 1 & 0 & 1 \end{bmatrix}}^{C} \overbrace{\begin{bmatrix} x_1(t) \\ x_2(t) \\ x_3(t) \\ x_4(t) \\ x_5(t) \end{bmatrix}}^{X(t)} + v(t)$$

where C is the output matrix and v(t) is the measurement noise.

The variances of the process and measurement noises are previously defined by trial-and-error to achieve a satisfactory match between the measured and the estimated output of an example. The optimal state estimation, according to Kalman filter formulation, is calculated as follows:

$$\frac{d\hat{X}(t)}{dt} = A\hat{X}(t) + K_e(y(t) - \hat{y}(t)) = (A - K_e C)\hat{X}(t) + Gy(t)$$

where $K_e$ is the optimal Kalman gain computed from the noise variances and the model matrices. The estimated state vector ($\hat{X}(t)$) is obtained integrating the above differential equation.

Then, the state feedback controller 132 is applied using a linear combination of the real and imaginary parts of the model space vectors as the control variable u(t):

$$u(t) = -K_c \hat{X}(t) = -\overbrace{\begin{bmatrix} k_{c1} & k_{c2} & k_{c3} & k_{c4} & 0 \end{bmatrix}}^{K_c} \overbrace{\begin{bmatrix} \hat{x}_1(t) \\ \hat{x}_2(t) \\ \hat{x}_3(t) \\ \hat{x}_4(t) \\ \hat{x}_5(t) \end{bmatrix}}^{\hat{X}(t)}$$

The DC value is not used in the control variable computation to guarantee a controller with DC gain equal to 0. Frequencies $f_1$ and $f_2$ and gains $k_{c1}$, $k_{c2}$, $k_{c3}$ and $k_{c4}$ applied to the state variables are the six design parameters of the damping module 130 stabilizer. The final state-space model of the damping module 130 module is expressed as follows:

$$\frac{d\hat{X}(t)}{dt} = E\hat{X}(t) + Gy(t)$$

$$u(t) = H\hat{X}(t)$$

where $E = A - K_e C$, $G = K_e$ and $H = -K_c$. This model is single-input single-output (SISO), linear and time-invariant (LTI). Therefore, an equivalent fifth-order transfer function can be calculated to represent exactly this SISO and LTI model. The structure of this transfer function can be written as:

$$F(s) = \frac{U(s)}{y(s)}$$

$$= \frac{K(1 + T_1 s)}{(1 + T_2 s)} \frac{s(s^2 + 2\rho_3 w_{n3} s + w_{n3}^2)}{(s^2 + 2\rho_1 w_{n1} s + w_{n1}^2)(s^2 + 2\rho_2 w_{n2} s + w_{n2}^2)}$$

where $\rho_1$ and $w_{n1}$ are, respectively, the damping factor and the natural frequency (rad/s) of the lower-frequency second-order component in the filter transfer function; $\rho_2$ and $w_{n2}$ are, respectively, the damping factor and the natural frequency (rad/s) of the upper-frequency second-order component in the filter transfer function; $\rho_3$ and $w_{n3}$ are, respectively, the damping factor and the natural frequency (rad/s) of the second-order zeroes in the filter transfer function; K is an additional gain of the filter transfer function; $T_1$ is the lead time constant in the lead-lag first-order compensator; and $T_2$ is the lag time constant in the lead-lag first-order compensator.

Notice that the damping module 130 is not applied as a transfer function because of the lower robustness of this kind of implementation. However, the transfer function is useful to understand the effect of the damping module 130 in the frequency domain. F(s) shows that the resulting damping module 130 is a double band-pass filter synchronized at two different frequencies, $w_{n1}$ and $w_{n2}$ in rad/s, together with a first-order lead-lag compensator to achieve an acceptable stability margin. The weaker the grid connected to the generator is, the greater the separation required between $w_{n1}$ and $w_{n2}$ is. Splitting the band-pass filter in two (around frequencies $w_{n1}$ and $w_{n2}$) is very convenient when dealing with weak grids.

The most robust real-time implementation is obtained by a discrete-time state-space model with a sampling time $T_s$ and the following formulation:

$$\hat{X}[k+1] = M\hat{X}[k] + Gy[k]$$

$$u[k] = H\hat{X}[k]$$

being $M = A_d - K_e C$ and $$A_d = e^{AT_s}$$

$$= \begin{bmatrix} \cos(2\pi f_1 T_s) & -\sin(2\pi f_1 T_s) & 0 & 0 & 0 \\ \sin(2\pi f_1 T_s) & \cos(2\pi f_1 T_s) & 0 & 0 & 0 \\ 0 & 0 & \cos(2\pi f_2 T_s) & -\sin(2\pi f_2 T_s) & 0 \\ 0 & 0 & \sin(2\pi f_2 T_s) & \cos(2\pi f_2 T_s) & 0 \\ 0 & 0 & 0 & 0 & 1 \end{bmatrix}$$

Figure 4:
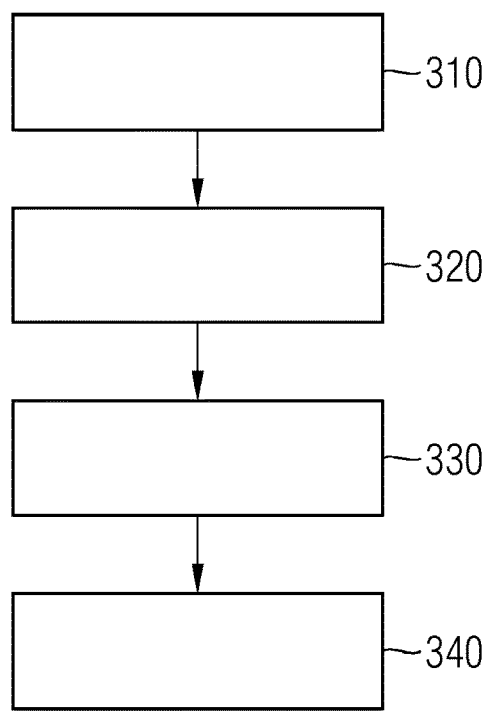
FIG. 4 depicts a flow chart of the process of computing the Kalman filter settings, according to an exemplary embodiment of the present invention.

FIG. 4 presents an exemplary embodiment of the off-line tuning of the Kalman filter and state-feedback controller settings for robust operation. The sensible operations are first defined 310, then the set of plants is computed 320, an optimization process is undertaken 330 and, as a result, Kalman filter and state-feedback controller settings are defined 340. Kalman filter and state-feedback controller require six tuning parameters corresponding to the frequencies of the two spinning vectors (Kalman filter) and the four gains (state-feedback controller) applied to sin and cosine components of the two spinning vectors. These parameters are tuned for obtaining a robust solution for the whole operational scenarios implying different wind speed, reactive power level and short-circuit impedance. The stability criteria employed in the optimization are minimum damping and maximum sensitivity. The objective function is the minimization of the maximum sensitivity of all possible scenarios guaranteeing that the system is stable. This means that the minimum damping of the whole system (i.e.

machine controllers, converters and grid) in all scenarios considered should be positive.

Tuning the damping module 130 involves an optimization carried out using a set of feasible plants. This set of plants is defined by linearization of a power system non-linear model at different operating points and critical parameter values. For example, different values of wind speed, grid reactance, compensation factor or reactive power are considered when defining the set of plants for the damping module 130 tuning purposes. The optimization parameters are frequencies $f_1$ and $f_2$ and gains $k_{c1}$, $k_{c2}$, $k_{c3}$ and $k_{c4}$ in the damping module 130, whereas the noise Kalman filter variances are set as constant values. The optimization cost function is the maximum sensitivity of the system with a chosen damping module 130. This optimization cost function is only considered valid if the stability of the power system is guaranteed, i.e. the minimum damping calculated by modal analysis must be greater than zero. This optimization cost function is a standard selection in robust control theory.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A system of subsynchronous oscillations and interactions damping comprising:
    at least one damping module integrated in a rotor converter, the at least one damping module configured to generate an output damping signal from an input power measurement; and
    at least one proportional integer controller integrated in the rotor converter, the output damping signal incorporated to an input of the at least one proportional integer controller;
    wherein an output of the at least one proportional integer controller is output to a machine rotor;
    wherein the at least one damping module further comprises a Kalman filter and a state feedback controller with a first spinning vector for subsynchronous modes, and a second spinning vector for supersynchronous modes.

2. The system according to claim 1, wherein the proportional integer controller in whose input the damping signal is incorporated is a power proportional integer controller.

3. The system according to claim 2, further comprising a subtraction module at the input of the power proportional integer controller which subtracts the output damping signal from a set-point value for an active power.

4. The system according to claim 2, further comprising a subtraction module at the input of the power proportional integer controller which subtracts the output damping signal from a set-point value for a reactive power.

5. The system according to claim 1, wherein the proportional integer controller in whose input the output damping signal is incorporated is a current proportional integer controller.

6. The system according to claim 5, further comprising a multiplier module which multiplies the output damping signal by a relation between an induction generator magnetizing inductance and a stator inductance; and a subtraction module at the input of the current proportional integer controller which subtracts the multiplied damping signal from a set-point d-axis rotor current components.

7. The system according to claim 6, wherein the set-point d-axis rotor current components is computed at a power proportional integer controller using as inputs the active power and set-point active power.

8. The system according to claim 6, wherein the set-point d-axis rotor current components is computed at a power proportional integer controller using as inputs the active power and set-point reactive power.

9. The system according to claim 1, wherein the input power measurement is selected between a wind turbine active power and a common coupling voltage.

10. A method of subsynchronous oscillations and interactions damping comprising:
    measuring an input power measurement;
    generating an output damping signal from the input power measurement; and
    incorporating the output damping signal to an input of at least one proportional integer controller;
    applying an output of the at least one proportional integer controller to a machine rotor;
    wherein the generating the output damping signal further comprises applying a Kalman filter and a state feedback controller with a first spinning vector for subsynchronous modes, and a second spinning vector for supersynchronous modes.

11. The method according to claim 10, wherein variables of the first spinning vector comprise a first frequency, a first gain and a second gain; and variables of the second spinning vector comprise a second frequency, a third gain and a fourth gain.

12. The method according to claim 10, wherein the Kalman filter is applied through a discrete-time state-space model with a sampling time.

13. The method according to claim 10, further comprising optimizing the variables of the first spinning vector and the second spinning vector by minimizing maximum sensitivity under a constraint of positive damping for a plurality of wind turbine generation plant scenarios.

14. The method according to claim 13, wherein the plurality of wind turbine generation plant scenarios comprise variations of at least one parameter selected from wind speed, grid reactance, compensation factor and reactive power.

15. A computer program product comprising computer program code stored on a non-transitory hardware storage configured to perform the method according to claim 10, when the computer program code is run on programmable hardware.

* * * * *